Figure 1:
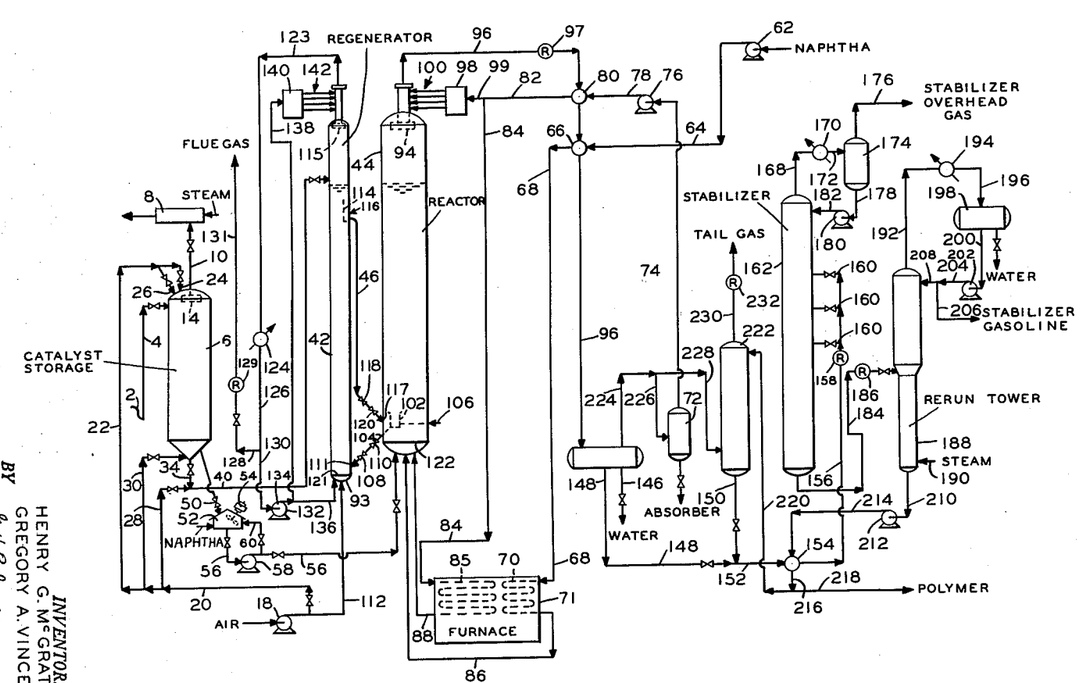

May 8, 1962     H. G. McGRATH ETAL     3,033,780

HYDROCARBON CONVERSION SYSTEM

Filed Dec. 23, 1954

*INVENTORS*
HENRY G. McGRATH
GREGORY A. VINCENT
BY
*G. H. Palmer*
*T. C. Virgil*
ATTORNEYS

United States Patent Office

3,033,780
Patented May 8, 1962

3,033,780
HYDROCARBON CONVERSION SYSTEM
Henry G. McGrath, Union, N.J., and Gregory A. Vincent, San Anselmo, Calif., assignors to The M. W. Kellogg Company, Jersey City, N.J., a corporation of Delaware
Filed Dec. 23, 1954, Ser. No. 477,359
8 Claims. (Cl. 208—136)

This invention relates to an improved hydroforming process, and more particularly, it pertains to an improved process for converting a light hydrocarbon oil to gasoline product of high anti-knock quality in an economical and efficient manner.

This application is a continuation-in-part of Serial No. 288,433, filed May 17, 1952, now abandoned which in turn is a continuation-in-part of Serial No. 130,200, filed November 30, 1949, now abandoned.

Fluid hydroforming is an effective method for converting light hydrocarbon oils to gasoline product of high anti-knock quality. In the operation, the reaction conditions, such as temperature, pressure, catalyst to oil ratio and hydrogen rate, are important insofar as selectivity and activity are concerned, however, in order to provide an economical system and minimize the production of undesirable product materials, such as carbon and normally gaseous hydrocarbons, the method of supplying heat for the reaction, the recovery of catalyst fines, stripping of catalyst, introduction of reactant material to the reaction zone, etc., are also important. The present invention provides a fluid hydroforming process whereby high quality gasoline product is obtained in an economical and efficient manner.

Another object of this invention is to provide an improved hydroforming process.

Another object of this invention is to provide an economical and efficient method of converting light hydrocarbon oil to high octane quality gasoline.

Other objects will become apparent from the following description.

The method of this invention comprises passing light hydrocarbon oil vapors, e.g., naphtha and hot hydrogen containing gas separately through a dense fluidized bed of finely divided hydroforming catalyst in a reaction zone at a temperature of about 825° to about 1025° F., preferably about 850° to about 925° F., or about 900° to about 960° F., a pressure of about 25 to 750 p.s.i., preferably about 100 to 500 p.s.i. and a low catalyst to oil ratio of about 0.03 to 3.0, preferably about 0.10 to 3.0 or 0.25 to 3.0, withdrawing a stream of reaction product containing a small amount of residual entrained catalyst overhead from the reaction zone, withdrawing a stream of the dense fluidized bed in said reaction zone, stripping adsorbed hydrocarbon material from the stream of catalyst, regenerating the stripped catalyst particles by burning off carbonaceous deposits in a dense fluidized bed in a regeneration zone, controlling the temperature of the catalyst undergoing regeneration to below about 1200° F., withdrawing catalyst particles from the regeneration zone and recycling the same to the reaction zone, separating residual catalyst material entrained with the stream of reaction products, optionally passing fresh light hydrocarbon oil feed, e.g., naphtha and/or the hydrogen containing gas in indirect heat exchange relation to the stream of reaction products to remove some of the heat therefrom, heating the hydrocarbon feed, with or without preheat, to about 750°–1050° F. or preferably, about 800° to 1000° F. prior to introducing the same into the reaction zone, cooling the stream of reaction products, with or without prior cooling, to condense hydroformate, separating hydroformate from gaseous constituents of the reaction products stream, heating said gaseous constituents to a temperature which is greater than the temperature of the hydrocarbon reactant, e.g., about 1100° to 1350° F., preferably about 1100° to 1200° F. The hydroforming reaction is effected in the presence of hydrogen which is supplied in the form of a hydrogen containing gas at a rate of about 1000 to about 10,000, more usually, about 1000 to about 6500, and preferably about 1000 to about 4000, standard cubic feet (measured at 60° F. and 760 mm. Hg) per barrel of oil feed, abbreviated as "s.c.f.b." The quantity of oil feed relative to the catalyst in the reaction zone is defined as the weight space velocity, that is, the pounds of oil feed charged to the reaction zone per hour per pound of catalyst present therein. For the purpose of this invention, the weight space velocity is about 0.1 to about 2, and preferably about 0.15 to about 1.5.

In the case of processing naphtha fractions having an end point of about 410° to about 465° F., it is found that there is an unexpectedly high yield of 10# RVP liquid product if the operating factor, as defined hereinbelow, is less than about 0.15. The operating factor is the product of the weight space velocity and the catalyst to oil ratio on a weight basis. For this purpose, the weight space velocity is about 0.1 to about 2, preferably about 0.3 to about 0.6, and the catalyst to oil ratio is less than about 0.5:1, and preferably about 0.03–0.30:1. The operating factor can be at least about 0.02 and less than 0.15 in order to derive the unusually high yield of 10# RVP liquid product. Further, the catalyst to oil ratio on a weight basis can be at least 0.03:1 and less than about 0.5:1.

The feed material for the present invention is a light hydrocarbon oil, e.g., gasoline, naphtha or kerosene or mixtures of the foregoing. The light hydrocarbon oil feed material is charged to the reaction zone as a separate stream from the recycle gas or hydrogen containing gas. The purpose for the separate introduction of the reactant streams is to minimize thermal cracking of the hydrocarbon material and thereby reduce the quantity of normally gaseous material and carbon which is formed in undesirable quantities by non-selective cracking reactions. The light hydrocarbon oil can be derived from a straight run operation, a thermal or catalytic cracking operation or it can be a mixture of materials derived from each kind of operation. The feed material has an initial boiling point of about 75° to about 275° F. and an end point of about 320° to about 475° F. In the case of a naphtha feed, the initial boiling point is about 85° to about 265° F. and it has an end point of about 320° to about 460° F. It is preferred that the naphtha feed material for the hydroforming process have an end point in the range of about 320° to about 420° F. The feed material for the hydroforming process has a Watson characterization factor of about 11.50 to about 12.20. By virtue of the various sources from which the feed material can be derived, the initial octane can range from about 5 to about 60 c.f.r.r. clear. The naphthene concentration of the feed material can alone vary over a wide range, and it can be about 10 to about 50% by volume. The sulfur concentration of the feed material will be about 0.005 to about 3% by weight, more usually, about 0.01 to about 2.0% by weight. In the case of charging a sulfur containing feed material to the hydroforming zone, it is preferred to use steam as a stripping agent in order to reduce the concentration of sulfur contained in the spent catalyst being transferred to the regeneration zone for reactivation treatment. As a result of the hydroforming process, the feed material is converted to a high anti-knock motor fuel or gasoline product.

The catalyst employed in our process can be any known hydroforming catalyst. Suitable catalysts are, for example, the compounds of metals in groups V and VI of the periodic table or, preferably, the sulfides and/or oxides of metals of groups V and VI of the periodic table. Specific examples of these catalysts are molybdenum trioxide-alumina, chromia-alumina, molybdena-alumina, molybdenum trioxide-zinc aluminate spinel, phosphomolybdic acid-alumina, etc. The catalytic element can be supported on a variety of known carrier materials, such as alumina, silica-alumina, zinc aluminate spinel, kieselguhr, pumice, activated charcoal, magnesia, alumina-magnesia, etc. The catalytic element comprises about 0.1 to about 50% by weight, more usually, about 1 to about 20% by weight, based on the total catalyst.

The catalyst is employed as a finely divided solid material having a particle size of about 5 to about 250 microns, more usually, about 10 to about 100 microns. The catalyst is fluidized by the upward passage of gaseous or gasiform materials therethrough to form a dense fluidized bed having situated above it a dilute of diffuse phase. The rate of gaseous material passing through the catalyst bed is sufficient to provide a superficial linear gas velocity of about 0.1 to about 25 feet per second, more usually, about 0.1 to about 6 feet per second and, preferably, about 0.5 to about 2.5 feet per second. Such velocities provide, on a free volume basis, a contact time between catalyst and reactants of about 20 to about 300 seconds, more usually, about 75 to about 175 seconds.

The hydroforming process involves several reactions such as, for example, dehydrogenation, isomerization, dehydrocyclization, hydrogenation, etc. The net effect of these reactions is endothermic, consequently, it is necessary to supply heat to the reaction zone. For this purpose, it is desirable to supply the reactant materials to the reaction zone at an elevated temperature, and thus a portion of the necessary heat for the process is derived by this method. In this respect, however, the hydrocarbon reactant, namely, the light hydrocarbon feed is fed to the reaction zone in the preferred range of about 800° to about 1000° F. Depending upon the type of feed employed, this temperature can be varied over a range of about 750° to about 1050° F., however, it is desirable to maintain the temperature within the range at which thermal cracking effects are kept to a minimum to prevent non-selective cracking reactions from occurring. On the other hand, the recycle gas or hydrogen containing gas which is produced in the system is heated to a temperature greater than the temperature of the feed material. In this respect, the feed material is heated to a temperature of about 1100° to about 1350° F., preferably about 1100° to about 1200° F. The hydrogen containing gas can be supplied at a higher temperature than the hydrocarbon feed and, therefore, this gaseous stream serves to supply a substantial portion of the endothermic heat required in process. This is possible since there is little danger of adverse effects resulting from the high temperature of the recycle gas stream per se. Further, in order to minimize the quantity of heat which is supplied by extraneous sources to the process, it is contemplated utilizing the sensible heat of the reaction product for preheating various processing streams. In this connection, the recycle gas stream can be heat exchanged with the reaction product alone and/or the reaction product can be heat exchanged with the hydrocarbon feed material. In this manner, a substantial portion of the sensible heat in the vaporous reaction product is utilized for heating the reactant streams.

By virtue of the upward passage of reactant materials through the dense bed in the reaction zone, a substantial quantity of catalyst is entrained in the gaseous material leaving the dense bed in the operation of this process. A portion of the diffuse or lean phase situated above the dense bed is withdrawn from the reaction zone, however, in order to avoid an undesirable loss of catalytic material or minimize subsequent treatment for the recovery thereof, the gaseous material is subjected to a preliminary separation treatment, for example, such as by cyclone separators or filters. In the case of cyclones, they can be situated internally, that is within the disengaging zone of the reactor, or such cyclones can be situated externally. In either event, the cyclones are provided with diplegs by which the recovered catalyst is returned to the dense bed situated within the reaction zone. Notwithstanding the use of cyclone separators, in order to reduce the loss of catalyst which is contained in the gaseous stream being discharged from the cyclone separators, it is desirable to subject the vaporous reaction product to a scrubbing treatment in a suitable zone for this purpose. In this regard, the vaporous reaction product is contacted with a liquid, e.g., a high boiling hydrocarbon oil, by spraying the same downwardly in countercurrent fashion to the upflowing vaporous reaction product and thereby scrubbing entrained catalyst fines therefrom and also to condense or liquefy a portion of the high boiling normally liquid product contained in the vaporous reaction product. The higher boiling normally liquid material is commonly referred to as the polymer. It can have an initial boiling point falling within the range of the end point of the gasoline product. Accordingly, the initial boiling point of the polymer can vary from about 375° to about 425° F., more usually, about 400° F. For the purpose of recovering catalyst fines, polymer material can be used as the scrubbing means, consequently, a saving is effected and there is little danger in contaminating the reaction product with a hydrocarbon material derived from an extraneous source. Following the scrubbing step in which catalyst fines are recovered and at least a portion of the polymer is condensed therefrom, the product stream is further cooled to condense substantially all of the remaining liquid product material or hydroformate. As a result, the normally gaseous product, which is rich in hydrogen, remains and a portion of this stream is utilized as a source of hydrogen for the hydroforming process. In general, the hydrogen containing gas or normally gaseous product material employed as recycle gas contains about 30 to about 85% by volume of hydrogen, more usually, about 40 to about 75% by volume.

In order to maintain a reasonably constant activity level in the reaction zone, a stream of spent catalyst is withdrawn directly and continuously from the catalyst bed in the reaction zone. The spent catalyst stream contains adsorbed hydrocarbons as well as occluded hydrocarbons and it is desirable to strip such materials from the catalyst material prior to regeneration treatment. For this purpose, the spent catalyst is subjected to a stripping treatment in a stripping zone by means of a gasiform stripping agent such as, for example, steam. By this method, the adsorbed hydrocarbons as well as any occluded hydrocarbons are removed to a substantial extent and thereafter the spent catalyst is passed to the regeneration zone for reactivation treatment. The gasiform stripping agent can also be recycle gas or hydrogen containing gas, nitrogen, carbon dioxide, flue gas, etc. It is preferred to employ steam as the stripping agent by reason of the high stripping efficiency obtained by its use. The stripping treatment is effected at a temperature falling within the range of reaction temperature or the temperature can be higher or lower than the reaction temperature. In any event, it is desirable to effect a stripping treatment at an elevated temperature in order that the adsorbed and/or occluded hydrocarbons can be readily removed without danger of condensation, etc. Following the stripping treatment, the spent catalyst is passed to a separate regeneration zone wherein it is contacted with an oxygen containing gas such as, for example, air, diluted air containing about 1 to about 15% by volume of oxygen, etc. The regeneration treatment effects the combustion of the carbonaceous material which is deposited on the catalyst, and this combustion treatment is conducted at a temperature of below about 1200° F. and a temperature of at least about 650° F., more usually, the regeneration treatment is effected at a temperature of about 950° to about 1150° F. As a result of the regeneration treatment, the catalyst is readily heated to a temperature at which its sensible heat can be utilized in the reaction zone. Usually, it is preferred to maintain the catalyst temperature greater than the reaction temperature and, hence, utilize the sensible heat for the hydroforming process. In this connection, the regenerated catalyst has a temperature of about 25° to about 200° greater than the reaction temperature, more usually, about 100° to about 175° greater on the same basis.

In another aspect of this invention, it was found that the fluid hydroforming process for hydrocarbons boiling within the motor fuel range can be operated without hydrogen pretreatment, if the freshly regenerated catalyst is stripped with a non-reducing stripping gas to remove or render the catalyst substantially free of carbon oxides, e.g., carbon monoxide and dioxide and free oxygen, and the stripped regenerated catalyst is passed directly into the dense fluidized bed of catalyst in the reaction zone. In the regeneration of the spent catalyst, excess oxygen is used, consequently, it is to be expected that the freshly regenerated catalyst contains free oxygen as well as carbon oxides resulting from the combustion of carbonaceous material under suitable regeneration conditions including, for example, a regeneration temperature of about 1050° to 1200° F. and a pressure essentially the same as the reaction pressure. As a result of burning carbonaceous material, the catalyst is converted to a highly oxidized state, and this oxidized state is insured by the presence of excess oxygen in the regeneration zone for the removal of carbonaceous material. The catalyst is stripped by means of a non-reducing stripping gas, e.g., steam, nitrogen, etc., prior to introducing the same directly into the dense bed in the reaction zone where the hydrogen containing gas reacts with the catalyst to produce a catalyst in a lower oxidized state, however, the heat liberated is readily dissipated by the large volume of catalyst in the reactor. It is important that the stripped regenerated catalyst is not contacted with a reducing gas or hydrogen containing gas until it is passed to the dense bed of catalyst in the reaction zone.

The reaction zone contains a dense bed of finely divided hydroforming catalyst consisting essentially of a group VI metal oxide supported on a carrier material. The reaction is effected for the above aspect of this invention at a temperature of about 825° to 1025° F., preferably between 850° and 925° F. or 900° to 960° F., and at a pressure of about 50 to 750 p.s.i.g., preferably between 50 and 500 p.s.i.g. or about 150 to 500 p.s.i.g. The catalyst to oil ratio, on a weight basis, is about 0.03 to 1.5, preferably between 0.5 and 1.5 or at least 0.03 to less than 0.5. The weight space velocity is about 0.1 to 2.0, preferably between 0.15 and 1.5. The reaction is effected in the presence of hydrogen in the amount of about 1000 to 10,000 s.c.f.b.

In order to provide a better understanding of this invention, reference will be had to the accompanying drawing which forms a part of this specification.

In the drawing, the powdered catalyst comprising approximately 10 percent $MoO_3$ and 3 percent $SiO_2$ on an alumina gel support and ranging in fineness as indicated above, is introduced through flexible hose 2 and valved line 4 into catalyst storage tank 6 by sub-atmospheric pressure created in the tank by the passage of steam through aspirator 8 which is connected with the tank 6 by a valved line 10. The porous metal filter 14 prevents catalyst fines from being drawn out of tank 6 by aspirator 8. In charging the entire system with catalyst, the tank 6 is first filled and then the valves in the vacuum line 10 and supply line 4 are shut off. Air under pressure is supplied by compressor 18 through valved lines 20, 22, 24, 26 and 28 to transfer the catalyst. Air from pipe 30 aerates the catalyst in the tank to maintain it in fluidized condition. Line 24 carries compressed air into the interior of filter 14 when necessary to clear the filter of any catalyst fines adhering thereto. From pipe 26 compressed air is also admitted to the top of tank 6 to force the catalyst out of the bottom through valved line 34; whereas another stream of air moving through line 28 carries the catalyst through valved line 40 to the refractory-lined regenerator 42. When the storage tank is emptied, the procedure is repeated until both the regenerator 42 and reactor 44 contain the proper quantities of catalyst, the reactor being filled by the overflow of powder from the regenerator down standpipe 46, the catalyst in the latter vessel being constantly aerated to maintain its fluidity.

When the conversion and regeneration vessels are equipped with porous filters, little or no catalyst should be lost from the catalyst circulatory system during normal operation. However, if it becomes necessary to add a comparatively small amount of make-up catalyst while the hydroformer is on stream, this may be accomplished by discharging the powder from valved line 50 into slurry tank 52 where it is thoroughly slurried with naphtha by means of agitator 54. The slurry is drawn off through valved line 56 and forced by pump 58 into the bottom of the hydroforming reactor 44. To expedite slurrying the catalyst, a valved return line 60 is provided connecting the pump outlet and tank 52, whereby the pump may also be utilized as a mixer.

In normal operation of the plant, high-pressure pump 62 forces the liquid naphtha into the system through pipe 64. On passing through heat exchanger 66, the naphtha is heated to 550° F. and line 68 carries the feed to coil 70 in the furnace 71 where its temperature is raised to 990° F. The quantity and characteristics of the naphtha feed and the products derived therefrom are set forth in the table below.

Recycle gas (average molecular weight of 17.5) produced in the hydroforming reaction described hereinafter and consisting of 33.5 mol percent of hydrogen with the balance chiefly $C_1$ and $C_3$ along with minor quantities of $C_4$ and $C_5$ hydrocarbons, is obtained from surge drum 72. It is conducted through pipe 74, and transported by means of compressor 76 through line 78 and heat exchanger 80 where its temperature is elevated to 700° F. Continuing through pipes 82 and 84, it is heated to 1100° F. in coil 85 of the combination furnace 71. It will be noted that the naphtha is heated to a lesser degree than the recycle gas in order to minimize thermal cracking of naphtha in the furnace; by this means the soaking volume factor is held down to 0.34. Further, the recycle gas and naphtha feed were preheated by means of indirect exchange with the reaction product.

Leaving the furnace in four-inch exit line 86 and eight-inch exit line 88, the naphtha vapors and recycle gas, respectively, are introduced separately into the bottom of reactor 44. The conditions existing in the hydroforming reactor are tabulated immediately below:

to the reactor by gravity flow and catalyst is continuously being withdrawn similarly for regeneration.

TABLE I

| Feed | B.P.D. | Lbs./hr. | °API | Average mol weight | Weight percent | Vol. percent | ASTM octane rating |
|---|---|---|---|---|---|---|---|
| Mid-Continent naphtha | 7,500 | 85,500 | 49.3 | 141.0 | 100 | 100 | 25 |
| YIELD BALANCE | | | | | | | |
| 100% C₄ gasoline (10# RVP) | 5,975 | 66,830 | 52.8 | 103.2 | 78.2 | 79.6 | 80 |
| Gas free in inerts and H₂O | | 13,850 | | 22.9 | 16.9 | | |
| Polymer | 315 | 4,560 | 11.0 | 175.0 | 5.3 | 4.2 | |
| Carbon | | 260 | | | 0.3 | | |

TABLE II
Reaction Conditions

```
Reactor dimensions¹ ___________ 69½ ft. x 11¼ ft. I.D.
Catalyst in reactor ___________ 214,000 lbs.
Charge:
  Naphtha feed _______________ 85,500 lbs./hr.
  Recycle gas ________________ 5000 s.c.f.b. feed or 71,964
                                 lbs./hr.
  Regenerated catalyst (0.1% C.) 7530 lbs./hr.
Catalyst to oil ratio _________ 0.088.
Catalyst replacement rate _____ 3.52%/hr.
Superficial gas velocity ______ 0.4 ft./sec.
Bed density ___________________ 39 lbs./cu. ft.
Depth of bed¹ _________________ 54½ ft.
Weight space velocity _________ 0.4 wt. naphtha/hr./wt.
                                 cat. bed.
Volume space velocity (liquid
  basis) ______________________ 0.32 vol. naphtha/hr./vol.
                                 cat bed.
Gas contact time (net free vol-
  ume basis) __________________ 110 sec.
Pressures:
  Inlet gases ________________ 514.7 p.s.i.g.
  Inlet H₂ partial pressure __ 153.0 p.s.i.a.
  Above bed __________________ 500.0 p.s.i.g.
Temperatures:
  Feed _______________________ 990° F.
  Recycle gas ________________ 1100° F.
  Bottom of reactor bed ______ 950° F.
  Freshly regenerated catalyst 1100° F.
  Catalyst bed-average _______ 940° F.
  Dilute phase above bed _____ 930° F.
Net hydrogen production _______ 162 s.c.f.b. feed.
Average coke content of catalyst 4%.
```
¹ Based on knuckle radii.

After entering the reactor, the reactants spread laterally and rise through the very dense, turbulent bed of catalyst. Upon passing into the dilute phase region above the bed, most of the entrained catalyst drops out of the gasiform mixture and any remaining entrained fines are removed by the filter 94 as the products pass out of the reactor into ten-inch line 96 equipped with pressure regulator 97 which maintains the reaction pressure. The filter consists of four bayonet-type filter sections constructed preferably of porous stainless steel molded from the powdered metal; other suitable porous materials may be substituted as desired. To avoid excessive pressure drop through the filter, one of the four filter sections is always being cleared by blowing recycle gas through that section by means of line 82. This clearing of the filter sections is controlled by an automatic time-cycle valve system 98 of known construction which directs the gas passing through line 99 at the rate of 17,968 lbs./hr. successively into each of the four pipes in manifold 100 and the interior of one section of the filter for a period sufficient to blow the adhering powder off of the exterior of that filter section.

The circulation of catalyst between reactor 44 and regenerator 42 is an important feature of the present invention and is readily understood by reference to the drawing. The reactor is of the fluidized bed variety with the dense phase catalyst in random circulation therein; that is, the powder in the bed is moving in all directions and there is no substantial tendency for the bed as a whole to move upwardly, downwardly or laterally. However, regenerated catalyst is continuously being added The powder flows out through well 102 and 2½ inch pipe 104 on its way to the regenerator, and suitable provision is made for aerating the pipe to maintain the fluidized solids in free-flowing condition. Adsorbed hydrocarbons are stripped from the partially spent catalyst by the introduction of 715 pounds per hour of steam into the bottom of the well by means of line 106. Slide valve 108 controls the withdrawal of partially spent catalyst from the reactor and may be regulated by either manual or automatic control as set forth hereinafter. On the other hand, slide valve 110 is a safety valve which is normally open, but closes automatically in response to another differential pressure controller (not shown) when the pressure drop across the two valves becomes less than 2.0 p.s.i. This prevents any back-flow of gases from the regenerator into the reactor when the normal pressure differential is not available to prevent such back-flow. Line 104 is tapped below valve 108 and above valve 110 to provide pressure connections for the differential pressure controller operating valve 110.

The finely divided solids in line 104 have a density of 48 pounds per cubic foot, the maximum density in the catalyst circulation system. Accordingly, it is apparent by reference to the pressures tabulated in Table VI below, that the pressure differential between the bottom of well 102 and the catalyst inlet 111 in the regenerator, plus the pseudo-liquid or fluistatic head developed in the portion of line 104 above valve 108, is adequate to balance the 3.0 p.s.i. pressure drop across the two valves at a flow rate of 1.9 feet per second and carry the powder into the regenerator. Transfer lines 46 and 104 are both inclined at an angle of 45° or more to the horizontal to assure free flow of the powder therethrough.

The conditions for regeneration of the catalyst are set forth in the table immediately following.

TABLE III
Regeneration Conditions

```
Regenerator dimensions¹ _______ 78 ft. x 3¾ ft. I.D.
Catalyst in regenerator _______ 18,000 lbs.
Charge:
  Contaminated catalyst ______ 7790 lbs./hr.
  Recycled flue gas __________ 36,200 lbs./hr.
  Air ________________________ 4693 lbs./hr.
Excess air (above carbon require-
  ments) ______________________ 43.4%.
Superficial gas velocity ______ 1.2 ft./sec.
Depth of bed¹ _________________ 63 ft.
Bed density ___________________ 26 lbs./cu. ft.
Temperatures:
  Maximum ____________________ 1100° F.
  Recycled flue gas __________ 668° F.
  Air ________________________ 340° F.
  Contaminated catalyst ______ 950° F.
Inlet gas pressure ____________ 512 p.s.i.g.
Pressure above bed ____________ 500.9 p.s.i.g.
```
¹ Based on knuckle radii.

The regenerating gases consist of air in excess compressed to 525 p.s.i.g. by compressor 18 and delivered through pipe 112 to the regenerator where it is diluted with recycled flue gas (28.6 av. mol. wt.) from line 136. By reason of this dilution of the air, as well as the entrance temperature of the recycled flue gas, the regeneration temperature is prevented from rising to a degree which will damage the catalyst. A general upward movement of the catalyst takes place due to the entrance of contaminated powder near the bottom and the removal of regenerated catalyst through drawoff or standpipe well 114 which has an opening near the top of the bed. The dilute phase above the bed contains little of the powdered catalyst, and any fines remaining suspended in the flue gas are taken out by four-section filter 115 which is of the same construction as filter 94. By the time the catalyst nears the top of the bed, almost all of the carbonaceous matter has been burned off and it is ready to be ready to be returned to the reactor 44. A line 116 is optionally provided for the introduction to drawoff well 114 of steam at 600 p.s.i.g. or another suitable stripping agent, where it is desired to remove from the regenerated catalyst part or all of the inert gases such as carbon oxides (carbon dioxide and/or carbon monoxide) and free oxygen adsorbed thereon.

The 2½ inch standpipe 46 is equipped with the usual connections for aerating the powdered solids with steam, flue gases or other suitable gases and conveys the catalyst in extremely dense phase (48 lbs./cu. ft.) to reactor inlet 117. This inlet is preferably spaced from 90° to 180° around the circumference of the reactor from well 102 to avoid the possibility of any appreciable portion of the regenerated catalyst travelling directly from the inlet to the drawoff well in the reactor. Safety slide valve 118 is of the same construction and controlled by another differential pressure controller (not shown) in the same manner as valve 110. While valve 118 is normally fully open, slide valve 120 regulates the admission of regenerated catalyst into the reactor. Valve 120 may be regulated by hand but automatic control is preferred.

The circulation of catalyst between the reactor and regenerator may be regulated in response to variations in any of four conditions in the system: the temperature in any selected location in the bed of catalyst in the reactor; the depth of the reactor bed; the depth of the regenerator bed; and the carbon content of the partially spent catalyst in line 104. Conventional automatic control devices embodying a thermocouple or differential pressure controller can be used for the control of catalyst flow in connection with the first three conditions, or indicating devices may be substituted where it is desired to regulate the valves manually. However, valves 108 and 120 cannot both be satisfactorily regulated by automatic controls in accordance with the demands of the same one of these conditions. As a specific example, valve 120 may control the admission of regenerated catalyst to the reactor in response to the depth of the regenerator bed and valve 108 may control the withdrawal of partially spent catalyst from the reactor in response to the carbon content, the depth or the temperature of the reaction bed, but not in response to variations in regenerator bed depth, for this might easily result in both valves gradually closing completely.

The recommended manner of controlling catalyst circulation involves manual operation of valve 108 and automatic control of valve 120. The content of carbonaceous matter on the partially deactivated catalyst is determined frequently by analysis of samples withdrawn from taps in line 104 and valve 108 is adjusted by hand to increase or decrease the rate of withdrawing catalyst from the conversion bed as necessary to maintain the coke content and, consequently, the catalyst activity at the selected level. On the other hand, valve 120 in the catalyst return line 46 is regulated automatically by a differential pressure controller (not shown) to hold the top of the regeneration bed at the selected elevation. Since this arrangement does not provide for control of the reaction bed temperature, the preheating of the hydroformer feed is varied as required to hold the bed temperatures constant. This is accomplished through an automatic controller (not shown) which regulates the rate of feeding fuel to the firebox of furnace 71 in response to a thermocouple located in either the conversion bed or in line 90.

The fluistatic head produced in pipe 46 is sufficient to overcome both the static pressure increment and the 2.3 p.s.i. pressure drop across valves 118 and 120 at the 1.9 ft./sec. catalyst flow rate thereby transferring the catalyst from a zone near the bottom of hydroformer 44. In this connection, reference should be had to Table IV which sets up the pressure balance of the entire catalyst circulatory system:

TABLE IV

*Heights and Pressures*

| Location | Height above datum plane in feet | Pressure in psig. |
|---|---|---|
| Reactor bed—top | 62½ | 500.0 |
| Reactor well 102—top | 17 | 512.3 |
| Reactor well 102—bottom | 10 | 513.8 |
| Inlet of valve 108 | 3 | 514.8 |
| Regenerator catalyst inlet 111 | 2 | 511.8 |
| Regenerator bottom-knuckle radius 121 [1] | 0 | 512.2 |
| Regenerator bed—top | 63 | 500.9 |
| Regenerator well 114—top | 58 | 501.8 |
| Regenerator well 114—bottom | 53 | 502.8 |
| Inlet valve 120 | 12 | 516.5 |
| Reactor catalyst inlet 117 | 10 | 514.2 |
| Reactor bottom-knuckle radius 122 | 8 | 514.7 |

[1] Datum plane.

Thus, in this side-by-side reactor-regenerator system, it is possible to transfer the catalyst at substantially non-erosive velocities through small lines in a very dense phase by maintaining the proper balances of gas pressures and pseudo-liquid heads. A slightly lower pressure at the bottom of the regenerator than at the bottom of the reactor is recommended, while the pressures in the top or dilute phases in the regenerator and reactor should be approximately equal, that is not differing by more than about 5 p.s.i.

Referring again to the regeneration gases, these pass from filter 115 into pipe 123 at the rate of 50,203 lbs./hr. and are cooled from 1025° F. to 650° F. by cooler 124 which generates steam at 600 p.s.i.g. for the process. The flue gases leaving the cooler in line 126 are divided into two portions. One part of the gases is exhausted to the atmosphere through pipe 128, pressure regulator 129 and exhaust line 131 at the rate of 4953 lbs./hr. Regulator 129 maintains the desired back-pressure on the entire regeneration system. The second part of the gases passes through pipe 130 to a blower 132 which increases the pressure by 30 p.s.i. From the pump outlet 134, the major portion of these gases, 36,200 lbs./hr., is conducted to the bottom of regenerator 42 by pipe 136, while the remaining 9,050 lbs./hr. are carried by line 138 to automatically-operated blow-back valve arrangement 140, which is of the same construction as valve system 93 and successively directs air into one of the pipes in manifold 142 to clear one of the four sections of filter 115, while the other sections are filtering the gaseous regeneration effluent. The oxygen content of the gases in line 126 is continuously determined by suitable apparatus (not shown) and the output of air compressor 18 is regulated manually in order to maintain a constant predetermined oxygen concentration in the gaseous input to regenerator 42. This not only reduces the power consumption of compressor 18, but also prevents a build-up of oxygen in the recycle flue gas and the resulting increase in regeneration temperature.

Either external or internal cyclones equipped with diplegs projecting into the catalyst beds may be used instead of filters 94 and 115 and their respective blow-back systems for the separation of entrained catalyst fines in the effluent gases. To reduce the loss of catalyst from cyclone separators, it may be found desirable to employ liquid, e.g., a hydrocarbon oil, in scrubbing towers or Cottrell precipitators to remove extremely fine catalyst particles in the gaseous effluent from the cyclones.

Referring again to the reactor, conversion products, amounting to 175,915 lbs./hr. (27.4 av. mol. wt.), are carried overhead by line 96 through heat exchangers 80 and 66 thereby reducing the temperature of the products from 900° F. to 100° F. by the time they reach tank 144 where water is drawn off through line 146 at the rate of 628 lbs./hr. 78,703 lbs./hr. of crude liquid products (64.5° API) are withdrawn from tank 144 through valved line 148 and 22,128 lbs./hr. of absorber fat oil (17.7° API) passing down valved line 150 are commingled in line 152. This liquid mixture is first heated in heat exchanger 154 to 350° F. and then it passes through pipe 156 and reducing valve 158, where the pressure is dropped from about 465 p.s.i.g. to 325 p.s.i.g. and a portion of the liquid product vaporizes. This vapor liquid mixture is introduced via valved branch lines 160 into stabilizer 162 which is provided with suitable means for reheating liquid drawn from the bottom tray to 470° F. The effluent vapor is taken overhead at 150° F. through the line 168, cooled to 100° F. by cooler 170 and passed through pipe 172 into separating drum 174. The stabilizer overhead gas leaving this drum in line 176 amounts to 8789 lbs./hr. (33.7 av. mol. wt.) and contains an extremely small quantity of inerts. 54,300 lbs./hr. of condensate from drum 174 is drawn off through line 178 and pumped back to the stabilizer by recycle pump 180 through return line 182.

The bottoms from stabilizer 162 pass out through line 184 at the rate of 92,042 lbs./hr. of liquid hydrocarbons (41.0° API) and continue through reducing valve 186 on their way to re-run tower 188 where the pressure is maintained at 10 p.s.i.g. In the middle of the lower half of the tower (not shown), the descending liquid is withdrawn from one of the trays, reheated by conventional apparatus to 410° F. and returned immediately below that tray. In addition, 1540 lbs./hr. of steam are admitted to the bottom of this tower through pipe 190, and the product vapors are taken off overhead at 325° F. in line 192. Condenser 194 reduces this temperature to 115° F. and the condensate passes through pipe 196 into separation drum 198 where the water is collected and withdrawn separately from the liquid hydrocarbons which leave through line 200 and pump 202. Pump outlet line 204 branches into pipe 206 where 66,482 lbs./hr. (593° b.p.d.) of stabilized gasoline (52.3° API) of 80 ASTM octane rating is withdrawn, while another 20,000 lbs./hr. of the gasoline is recycled to the top of re-run tower 188 through line 208.

From the bottom of column 188, 25,560 lbs./hr. of 11.0° API polymer stock are drawn off through line 210 and forced by high-pressure pump 212 through pipe 214 and heat exchanger 154, where it is cooled from 375° F. to about 100° F. Leaving the exchanger in line 216, the polymer is divided and pipe 218 carries 4560 lbs./hr. to polymer storage, while the remaining 21,000 lbs./hr. are recycled through line 220 to the top of adsorber 222 for use as the absorbent.

Referring again to high-pressure separator 144, the effluent gas therefrom is carried off in pipe 224 with the major portion, 89,932 lbs./hr. (17.5 av. mol. wt.) passing through pipe 226 to the recycle gas surge drum 72, which is maintained at 100° F. and 464 p.s.i.g.; the balance, amounting to 6655 lbs./hr., goes through line 228 into the bottom of absorber 222. The absorber is maintained at 464 p.s.i.g., and the polymer stock flowing down the tower scrubs most of the $C_4$ and substantially all of the higher hydrocarbons out of the gas passing upward. 5525 lbs./hr. of tail gas (15.6 av. mol. wt.) of low inert gas and moisture content are taken off overhead to fuel gas storage facilities by line 230 equipped with constant-pressure regulator 232. The fat oil is drawn off through line 150 and mixed with the initial hydrocarbon condensate from the hydroformer, as described previously.

The discrepancies between the quantities of products set forth above and the yield balance in Table I results from incomplete recovery of $C_4$ hydrocarbons in the gasoline fraction as well as from the inert and moisture content of the stabilizer and tail gases actually produced.

The circulation of catalyst is produced by balancing the gas pressures and pseudo-fluid or fluistatic heads in various zones of the system in such manner that gravity flow through both transfer lines occurs without the catalyst coming in contact with either moving mechanisms or high velocity gas streams. To accomplish this with comparatively small pressure differentials or against somewhat higher pressures, the transfer conduits must slope downward in the direction of flow at an angle greater than the angle of repose of the fluidized solids. While the angle of repose varies with the material and the range of particle sizes, an angle of at least 30°, preferably 45° or more with the horizontal is generally satisfactory. Although short sections of these pipes, of say one or two feet in length, may be inclined less or may even be horizontal, that is not particularly desirable because the aerating fluid tends to separate from the powder at such points and this leads to the blocking of the line where long sections included at too shallow an angle are used. Proper inclination of the conduits insures that the resulting gravity-head constitutes a substantial portion of the pressure-differential needed for transferring the catalyst from one vessel to the other.

The conversion bed in the reactor is kept in turbulent condition by the passage of a gasiform stream therethrough. The motion of the individual catalyst particles is of a random nature, since both catalyst transfer lines are connected to the same general region in the lower portion of the bed. Thus, there is substantially no overall movement of the powder either upward or downward; hence, practically uniform catalyst activity is maintained in all zones of the conversion bed. Maintaining such reaction conditions constant is highly desirable in catalytic conversions, as it promotes product uniformity and high yields. On the other hand, the general or overall movement of catalyst in the regenerator is upward, since the partially deactivated catalyst enters at the bottom of the vessel and leaves by overflowing into a well at the top which is connected to the catalyst return line to the reactor. Inasmuch as the velocity of gases in the regenerator is below the catalyst-transport velocity, the individual catalyst particles are chiefly in random motion, but the overall movement of the bed is upward; thus the regenerator acts as a low-velocity, high-density carrier line, with the regeneration gases serving as the propelling force which lifts the powder under non-erosive conditions from the lowest to the highest point in the circulatory system to maintain the circulation therein.

In order to balance the pressures in the various parts of the catalyst circulation system, it is essential to have a lower bed-density in the regenerator than in the reactor. The maximum catalyst density will be found in the transfer line, as this provides maximum fluistatic pressure bands to overcome not only the pressure-drop in the lines and particularly across the control valves, but also the pressure increment when the catalyst is flowing toward a zone of higher pressure. Accordingly, the density of the catalyst in the transfer line is maintained at a constant value that is as high as is consistent with providing sufficient aeration to keep the catalyst in a free flowing condition. In general, it may be said that the density of the catalyst in the transfer lines should range from 40 to 50 pounds per cubic foot and the conversion bed density should be from 45 to 85% of the transfer line density, with the regeneration bed density running 50 to 75% of the conversion bed density in order to keep the heights of the reactor and regenerator within economical limits.

The depths of the conversion and regeneration beds and the static pressures maintained in the spaces above these beds are also important in maintaining a balanced system through which the catalyst will flow. The depth of the regeneration bed should be from 5 to about 50% greater than the depth of the conversion bed for the type of flow indicated. It is preferred to maintain the tops of both beds on approximately the same level in order that the base of the regeneration bed will be located sufficiently far below that of the conversion bed to provide the required gravity head for transfer of the fluidized solids. The system disclosed herein may be operated at various pressures, but it is preferable to have approximately equal pressures in the dilute phase or catalyst disengagement zones above the beds. It is also recommended that the pressure at the bottom inlet of the drawoff well in the reactor be at least equal or up to 5.0 pounds per square inch (p.s.i.) greater than the static pressure at the catalyst inlet to the regenerator, while the static pressure at the bottom of the standpipe well in the regenerator should not be more than about 17 p.s.i. below the pressure at the catalyst inlet to the reactor in order that the gravity head developed in the long standpipe may be adequate to convey the powder to the zone of higher pressure.

Various experiments were conducted on a pilot plant scale in order to determine the manner by which a fluid process of hydroforming should be conducted. The feed and recycled product gas were preheated separately to the temperatures necessary to maintain the endothermic dehydrogenation and aromatization reactions by being pumped through separate coils in two separate two-stage preheating baths of molten lead. Both were separately introduced in the bottom of the reactor, which consisted of a three-inch pipe 48 feet long surmounted by an eight-inch I.D. filter housing in which three porous stainless steel, bayonet-type filters were installed. The reactor was provided with external heating elements and an insulating jacket over its entire length, so that substantially no heat was gained or lost through the reaction shell by the bed of fluidized catalyst therein. Thermocouples were located at various levels inside the reactor. A blowback valve arrangement provided with automatic time-cycle control was provided for directing a stream of product gas backward through each of the three filter sections in sequence to keep the surface of the filters clear of adhering catalyst particles. At four-hour intervals, partially spent catalyst was withdrawn from a point near the bottom of the reactor into a lock-hopper vessel, then an equivalent amount of fresh catalyst was introduced near the top of the reactor through a similar hopper, using recycle gas or extraneous hydrogen under sufficient pressure to transfer the catalyst from the charging vessel to the reactor. The streams of naphtha and recycle gas commingled in the bottom of the reactor and passed upwardly through the fluidized dense phase bed of powdered catalyst into a dilute phase above the bed. The gasiform effluent then passed through the porous stainless steel filters, which removed all entrained catalyst fines, through a cooler and into a high pressure separating drum. The gas from this separator was taken to the inlet of the compressor and a portion thereof was recirculated back to the recycle gas preheater and through the reactor again, while other portions, also calculated as recycle gas, were used for charging the reactor and as blow-back gas for clearing the filters. Excess high pressure product gas was sampled and automatically vented from this system through a wet test meter. Extraneous hydrogen was added to the recycle gas in some instances through a high pressure wet test meter to simulate hydrogen enrichment of the recycle gas. The crude liquid product from the separator was depressured through a level control valve and passed through a low pressure (essentially atmospheric pressure) separator. The gases which flashed from the liquid here was sampled and vented from the system through a wet test meter. The liquid was drawn off from the bottom of the low pressure separator for storage and analysis. In the operation of this pilot plant, the recycle gas and a considerably higher hydrogen content than is obtainable in commercial operations, because the water from cooling the condenser was available at considerably lower temperatures than those on which commercial design must be predicated. The resulting low temperature in the high-pressure separator suppressed the evaporation of the less volatile hydrocarbons without having an equivalent effect on the more volatile hydrocarbons.

For carrying out the runs, starting with run 7, the pilot plant was modified by incorporating a regenerator and a catalyst storage vessel, both of which were of the same construction and dimensions as the reactor and were provided with similar automatic blow-back valve arrangements for clearing the filters. The only changes made in the reactor or conversion system were the installation of an eighteen-inch long collar of two-inch internal diameter at the bottom of the reactor to increase the superficial linear gas velocity at this point for the purpose of improving the intimacy of contact of the naphtha, circulating gas and catalyst, and the substitution of a single two-stage preheater in which naphtha and the circulating gas were heated together to the desired temperature. Except for the use of regenerated catalyst, this system was operated in the same manner as the original pilot plant. Regenerated catalyst was maintained at reaction temperature in the sttorage vessel by means of the heating elements surrounding this vessel and was kept in a fluidized condition by aerating with nitrogen under a pressure corresponding to that in the reactor. After a portion of the catalyst in the conversion bed had been drawn off into the lock-hopper vessel at the bottom of the reactor, an equivalent quantity of regenerated catalyst was withdrawn from the bottom of the storage vessel and transported by recycle gas to the top of the reactor. The partially spent catalyst was transported from the lock-hopper vessel to the top of the regenerator by a stream of nitrogen. The regeneration vessel was not operated continuously, but was filled gradually with partially spent catalyst over a period of about 24 hours. Prior to regeneration the catalyst was maintained at a temperature of 700° F. by heating elements similar to those on both the reaction and storage vessels. When the regenerator was full of the powder, the regenerating gases, which consisted of air diluted with nitrogen, were preheated in a heater similar to that used to preheat the feed and passed through the bed of catalyst under a pressure of 500 p.s.i.g. Regeneration was continued until substantial quantities of oxygen were found in the effluent gases; then the entire contents of the regenerator were withdrawn from the bottom and transferred to the catalyst storage vessel by a stream of compressed air.

Various feed stocks of Mid-Continent origin were hydroformed in accordance with the procedures described above, these feed stocks are given in Table V below:

TABLE V[1]

| Feed designation | I | II | III | IV | V | VI | VII |
|---|---|---|---|---|---|---|---|
| Gravity, °API | 49.3 | 53.1 | 48.5 | 52.2 | 53.4 | 53.1 | 51.2 |
| ASTM distillation, °F.: | | | | | | | |
| IBP | 233 | 186 | 232 | 188 | 205 | 214 | 260 |
| 10 | 290 | 251 | 288 | 252 | 248 | 250 | 286 |
| 50 | 352 | 308 | 350 | 312 | 305 | 306 | 322 |
| 90 | 408 | 371 | 408 | 376 | 377 | 381 | 380 |
| E.P. | 442 | 424 | 440 | 419 | 426 | 430 | 416 |
| Octane number CFRM | 25 | 38.8 | 25 | 35.0 | 36.0 | 34.7 | 34.2 |
| Olefins, mol percent | 0.7 | 1.3 | 0.7 | 0.6 | 0.6 | 1.0 | 0 |
| Aromatics, vol. percent | 12.3 | 0.7 | 11.3 | | 8.4 | 7.0 | 10.8 |
| Aniline point, °F. | 140 | 135 | 140 | 135 | 139 | 137 | 137 |

[1] Mid-Continent naphthas.

The catalyst employed for these experiments are given in Table VI below:

TABLE VI

*Catalyst Analyses*

| Catalyst | A | B | C | D | E |
|---|---|---|---|---|---|
| Alumina support | Gel | Gel | Activated | Gel | Gel |
| Chemical analysis, weight percent: | | | | | |
| $MoO_3$ | 9.5 | 8.5 | 9.5 | 9.5 | 9.5 |
| $Fe_2O_3$ | 0.91 | 0.80 | 0.10 | 0.74 | 0.8 |
| $Cl_2$ | 0.30 | 0.42 | 0.07 | 0.60 | 0.5 |
| $SiO_2$ | 2.82 | 3.34 | 0.0 | 2.85 | 2.8 |
| $Na_2O$ | | | 0.07 | | |
| Roller analysis, weight percent: | | | | | |
| 0–10 microns | 0.1–1.3 | 1.8 | 12.7–20.1 | 2.9–4.3 | 0–7 |
| 10–20 microns | 0.9–4.1 | 2.4 | 4.8–10.5 | 2.9–3.9 | 3–5 |
| 20–40 microns | 6.7–22.4 | 16.0 | 3.1–11.9 | 11.3–12.2 | 14–17 |
| 40–60 microns | 36.6–57.3 | 40.5 | 8.8–18.6 | 35.2–35.9 | 44–47 |
| 60+ microns | 21.8–54.3 | 39.3 | 46.3–85.1 | 44.4–47.0 | 39–24 |
| Screen analysis, weight percent: | | | | | |
| 40/100 mesh | | | 25.5–48.5 | 2.0 | |
| 100/140 mesh | 1.5–11.0 | 1.5 | 6.0–11.5 | 9.9 | 3–21 |
| 140/200 mesh | 25.0–51.5 | 38.5 | 12.0–40.0 | 23.2 | 13–53 |
| 200/325 mesh | 27.0–32.5 | 30.5 | 4.5–25.0 | 30.5 | 16–42 |
| 325/pan mesh | 18.5–37.0 | 29.5 | 2.0–24.5 | 34.4 | 10–41 |
| Specific gravity | 3.3 | 3.3 | 3.4 | | 3.3 |

The results obtained are reported in Table VII below:

Other experiments were conducted at a reaction pressure of 250 p.s.i.g. These results are given in Table VIII below:

TABLE VIII

| Run No | 1 | 2 |
|---|---|---|
| Catalyst | B | C |
| Feed | III | II |
| Operating conditions: | | |
| Temperature, °F. (avg.) | 951 | 934 |
| Pressure, p.s.i.g. | 250 | 250 |
| Circulating gas rate, SCFB | 5,720 | 5,420 |
| Mol percent $H_2$ in circulating gas | 68.5 | 68.0 |
| Extraneous hydrogen, SCFB | 610 | 618 |
| Total mols $H_2$/mol naphtha | 5.3 | 4.6 |
| Space velocity, $W_o/hr./W_c$ | 0.41 | 0.48 |
| $H_2$ partial pressure, p.s.i.a. | 166 | 163 |
| Catalyst/oil | 0.078 | 0.079 |
| Yields: | | |
| 100 percent $C_4$ gasoline, vol. percent | 77.8 | 81.2 |
| 10# RVP liquid, vol. percent | 85.1 | 83.8 |
| 10# RVP liquid at 80 CFRM, vol. percent | 84.6 | 84.8 |
| Polymer, weight percent | 8.1 | 2.7 |
| Carbon, weight percent | 0.41 | 0.17 |
| Butanes, weight percent | 5.5 | 4.8 |
| Dry gas, ($C_4$ free) weight percent | 15.2 | 15.2 |
| Hydrogen, SCFB | 200 | 268 |
| Inspections: 100 percent $C_4$ gasoline: | | |
| Octane number (CFRM) | 79.5 | 78.8 |
| Gravity, °API | 53.0 | 52.0 |
| Olefins, mol percent | 3.1 | 2.0 |
| Aromatics, vol. percent | 41.2 | 54.9 |

Having thus described our invention by providing specific examples thereof, it should be understood that no undue limitations or restrictions are to be imposed by reason thereof, but that the scope of the present invention is defined by the appended claims.

We claim:

1. A method of converting a light hydrocarbon oil into a high anti-knock motor fuel by hydroforming which comprises passing light hydrocarbon oil reactant vapors and separately introducing hot hydrogen-containing reactant gas through a dense fluidized bed of finely divided hydroforming catalyst in a reaction zone at a temperature of about 825° to about 1025° F., at a pressure of about 25 to about 750 p.s.i., and a catalyst to oil ratio by weight of from 0.03 to 0.5, withdrawing a stream of reaction products containing small amounts of residual entrained catalyst overhead from the reaction zone, withdrawing a stream of catalyst particles directly from the dense fluidized bed in said reaction zone, stripping adsorbed hydrocarbon material from the stream of catalyst, regenerating

TABLE VII

| Run No | 1 | 2 | 3 | 4 | 5 | 6 | 7 | 8 | 9 | 10 | 11 |
|---|---|---|---|---|---|---|---|---|---|---|---|
| Catalyst | A | A | A | C | C | C | D | E | E | E | E |
| Feed | I | I | I | II | II | III | IV | V | VI | VI | VI |
| Operating conditions: | | | | | | | | | | | |
| Temperature, °F. (avg.) | 935 | 939 | 950 | 938 | 927 | 931 | 928 | 931 | 920 | 922 | 910 |
| Pressure, p.s.i.g. | 500 | 500 | 500 | 500 | 500 | 500 | 500 | 500 | 500 | 500 | 500 |
| Circulating gas rate, SCFB | 5,335 | 5,110 | 9,460 | 9,520 | 4,560 | 4,980 | 4,930 | 4,990 | 4,980 | 4,990 | 5,090 |
| Mol percent $H_2$ in circulating gas | 69.7 | 50.5 | 53.5 | 48.1 | 45.4 | 40.4 | 52.4 | 50 | 55.8 | 54.4 | 55.6 |
| Extraneous hydrogen, SCFB | 518 | 50 | 51 | 64 | | 15 | 6 | | | | |
| Total mol $H_2$/mol naphtha | 5.1 | 3.5 | 6.9 | 5.8 | 2.6 | 2.7 | 3.25 | | | | |
| Space velocity, $W_o/hr./W_c$ | 0.41 | 0.41 | 0.42 | 0.55 | 0.48 | 0.49 | 0.40 | 0.41 | 0.38 | 0.38 | 0.41 |
| $H_2$ partial pressure, p.s.i.a. | 322 | 232 | 260 | 232 | 203 | 184 | 232 | 224 | 248 | 242 | 248 |
| Catalyst/oil | 0.051 | 0.051 | 0.049 | 0.054 | 0.055 | 0.054 | 0.11 | 0.11 | 0.20 | 0.22 | 0.29 |
| Yields: | | | | | | | | | | | |
| 100 percent $C_4$ gasoline, vol. percent | 80.9 | 80.8 | 81.3 | 82.9 | 82.7 | 80.0 | 83.3 | 81.6 | 82.5 | 81.8 | 82.4 |
| 10# RVP liquid, vol. percent | 85.3 | 86.1 | 86.3 | 86.6 | 86.6 | 86.3 | 86.0 | 84.2 | 85.1 | 84.5 | 85.1 |
| 10 RVP liquid at 80 CFRM, vol. percent | 83.4 | 84.0 | 84.9 | 84.1 | 84.3 | 83.4 | 86.0 | 84.5 | 85.6 | 86.4 | 86.0 |
| Polymer, weight percent | 5.7 | 6.3 | 5.6 | 2.0 | 2.1 | 6.3 | 2.1 | 2.6 | | | |
| Carbon, weight percent | 0.18 | 0.26 | 0.21 | 0.09 | 0.14 | 0.26 | 0.43 | 0.40 | 0.71 | 0.73 | 0.82 |
| Butanes, weight percent | 6.6 | 6.3 | 6.3 | 5.0 | 5.4 | 5.2 | 5.9 | [1]7.1 | [1]7.5 | [1]7.8 | [1]7.4 |
| Dry gas ($C_4$ free), weight percent | 15.2 | 14.2 | 14.4 | 15.0 | 15.0 | 15.0 | 14.2 | 15.2 | 14.7 | 15.4 | 14.6 |
| Hydrogen, SCFB | 76 | 157 | 224 | 229 | 221 | 170 | 317 | 336 | 413 | 400 | 435 |
| Inspections: | | | | | | | | | | | |
| 100% $C_4$ Gasoline: | | | | | | | | | | | |
| Octane number (CFRM) | 77.7 | 77.5 | 78.3 | 80.6 | 77.1 | 76.3 | 80.1 | 80.2 | 80.2 | 81.0 | 80.4 |
| Gravity, °API | 54.4 | 53.5 | 53.7 | 53.7 | 53.2 | 52.3 | 51.8 | 53.0 | 52.5 | 52.7 | 52.8 |
| Olefins, mol percent | 2.0 | 2.8 | 2.2 | 1.5 | 2.0 | 2.3 | 1.7 | 1.5 | 1.2 | 1.1 | 0.9 |
| Aromatics, vol. percent | 40.8 | 39.3 | 42.0 | 43.4 | 45.8 | 42.8 | 47.0 | 45.0 | 47.0 | 47.0 | 45.5 |
| 10# RVP liquid: Octane number (CFRM) | 86.3 | 86.5 | 85.8 | 86.9 | 86.7 | 87.3 | 84.3 | | | | |

[1] Volume percent.

the stripped catalyst particles by burning off carbonaceous deposits in a dense fluidized bed in a regeneration zone, controlling the temperature of the catalyst undergoing regeneration to below about 1200° F., withdrawing catalyst particles from the regeneration zone and recycling the same to the reaction zone, separating residual catalyst material entrained with the stream of reaction products, passing at least one of the reactant materials in indirect heat exchange relation to the stream of reaction products thereby removing some of the heat therefrom, heating the light hydrocarbon oil reactant to a temperature of about 750° to about 1050° F. preparatory to introducing the same into the reaction zone, cooling the stream of reaction products to condense hydroformate, separating hydroformate from gaseous constituents of the reaction product stream, heating the gaseous constituents to a temperature which is greater than the temperature of the light hydrocarbon oil reactant prior to being introduced into the reaction zone but not higher than about 1150° F. and recycling the same to the reaction zone.

2. A method of converting a light hydrocarbon oil into a high anti-knock motor fuel by hydroforming which comprises passing light hydrocarbon oil reactant vapors and separately introducing hot hydrogen-containing reactant gas through a dense fluidized bed of finely divided hydroforming catalyst in a reaction zone at a temperature of about 825° to about 1025° F., a pressure of about 25 to about 750 p.s.i., and a catalyst to oil ratio of about 0.3 to about 0.5, withdrawing a stream of reaction products containing small amounts of residual entrained catalyst overhead from the reaction zone, withdrawing a stream of catalyst particles directly from the dense fluidized bed in said reaction zone, stripping adsorbed hydrocarbon material from the stream of catalyst, regenerating the stripped catalyst particles by burning off carbonaceous deposits in a dense fluidized bed in a regeneration zone, controlling the temperature of the catalyst undergoing regeneration to below about 1200° F., withdrawing catalyst particles from the regeneration zone and recycling the same to the reaction zone, separating residual catalyst material entrained with the reaction stream products, passing light hydrocarbon oil and hydrogen containing reactant gas separately in indirect heat exchange relation to the reaction products to remove some of the heat therefrom, further heating the preheated light hydrocarbon oil reactant to about 800°–1000° F. preparatory to introducing the same into the reaction zone, further cooling the stream of reaction products to condense the hydroformate, separating hydroformate from gaseous constituents from the reaction product stream, heating the gaseous constituents to a temperature which is greater than the temperature of the light hydrocarbon oil reactant prior to being introduced into the reaction zone but not higher than about 1150° F. and recycling the same to the reaction zone.

3. A method of converting a light hydrocarbon oil into a high anti-knock motor fuel by hydroforming which comprises passing light hydrocarbon oil vapors and separately introducing hot hydrogen containing reactant gas through a dense fluidized bed of finely divided hydroforming catalyst in a reaction zone at a temperature of 825° to about 1025° F., at a pressure of about 25 to about 750 p.s.i. and a catalyst to oil ratio by weight of about 0.03 to about 0.5, withdrawing a stream of reaction products containing small amounts of residual entrained catalyst overhead from the reaction zone, withdrawing a dense fluidized stream of catalyst particles directly from the dense fluidized bed in said reaction zone, stripping adsorbed hydrocarbon material from the dense fluidized stream of catalyst, passing the stripped dense fluidized stream of particles directly to a regeneration zone wherein carbonaceous deposits are burned therefrom in a dense fluidized bed, controlling the temperature of the catalyst undergoing regeneration to below about 1200° F., withdrawing a dense fluidized stream of catalyst particles from the regeneration zone and recycling the same to the reaction zone, separating residual catalyst material from the stream of reaction products, passing at least one of the reactant materials in indirect heat exchange relation to the stream of reaction products to remove some of the heat therefrom, heating the light hydrocarbon oil reactant to 750°–1050° F. preparatory to introducing the same into the reaction zone, cooling the reaction products to condense the hydroformate, separating hydroformate from the normally gaseous product containing hydrogen, heating the normally gaseous product containing hydrogen to a temperature which is greater than the temperature of the light hydrocarbon oil reactant prior to being introduced into the reaction zone but not higher than about 1150° F. and recycling the same to the reaction zone.

4. A method of converting light hydrocarbon oils into high anti-knock gasoline which comprises passing vaporized hydrocarbon reactant material and separately introduced hot hydrogen-containing gas through a dense fluidized bed of finely divided hydroforming catalyst in a reaction zone in the amount of about 1000 to about 10,000 cubic feet of hydrogen per barrel of hydrocarbon feed stock at a temperature of about 825° to about 1025° F., a pressure of about 25 to 750 p.s.i, a catalyst to oil ratio of about 0.03 to about 0.5 and a weight space velocity of about 0.1 to 2.0, withdrawing a stream of reaction product containing small amounts of residual entrained catalysts overhead from said reaction zone, withdrawing a stream of catalyst particles from the dense fluidized bed of said reaction zone, stripping adsorbed hydrocarbon material from the stream of catalyst, regenerating the stripped catalyst particles by burning off carbonaceous deposits in the dense fluidized bed of the regeneration zone, controlling the temperature of the catalyst undergoing regeneration to below about 1200° F., withdrawing catalyst particles from the regeneration zone and recycling the same to the reaction zone, separating the residual catalyst material entrained with the reaction products stream, passing at least one reactant material in indirect heat exchange relation to the reaction products to remove some of the heat from the reaction product, heating the light hydrocarbon oil reactant to a temperature of about 750° to about 1050° F. preparatory to introducing the same into the reaction zone, further cooling the stream of reaction products to condense hydroformate, separating hydroformate from normally gaseous product containing hydrogen, heating the normally gaseous product to a temperature which is greater than the temperature of the light hydrocarbon oil reactant prior to being introduced into the reaction zone but not higher than about 1150° F. and recycling the same to the reaction zone.

5. A method of converting naphtha into a high anti-knock motor fuel by hydroforming which comprises passing naphtha vapors and separately introduced hot hydrogen containing process gas through a dense fluidized bed of finely divided hydroforming catalyst in a reaction zone at a temperature of 850°–925° F. and at a pressure of 100 to 500 p.s.i.g. and at a low catalyst to oil ratio of less than about 0.5 by weight, withdrawing a stream of reaction products containing small amounts of residual entrained catalyst overhead from the reaction zone, withdrawing a stream of catalyst particles directly from the dense fluidized bed in said reaction zone, stripping adsorbed hydrocarbon material from the stream of catalyst, regenerating the stripped catalyst particles by burning off carbonaceous deposits in a dense fluidized bed in a regeneration zone, controlling the temperature of the catalyst undergoing regeneration to below about 1200° F., withdrawing catalyst particles from the regeneration zone and recycling the same to the reaction zone, separating residual catalyst material entrained with the stream of reaction products, passing fresh naphtha feed in indirect heat exchange relation to the stream of reaction products to remove some of the heat therefrom, further heating the preheated naphtha feed to a temperature of 800°–

1000° F. preparatory to introducing the same into the reaction zone, further cooling the stream of reaction products to condense hydroformate, separating hydroformate from gaseous constituents of the gaseous product stream, heating the said gaseous constituents to a temperature which is greater than the temperature of the naphtha feed prior to being introduced into the reaction zone and recycling the same to the reaction zone.

6. A method of converting naphtha fractions into high anti-knock gasoline which comprises passing vaporized hydrocarbon materials and separately introduced hot hydrogen-containing process gas through a dense fluidized bed of finely divided hydroforming catalyst in a reaction zone in the ratio of 1000 to 4000 cubic feet per barrel of naphtha feed stock at a temperature of 850°–925° F. and at a pressure of 100–500 pounds per square inch at a low catalyst to oil ratio of less than about 0.5 by weight and at a space velocity of 0.15 to 1.5 (pounds of hydrocarbon feed per hour per pound of catalyst in the reactor), withdrawing a stream of reaction products containing small amounts of residual entrained catalyst overhead from said reaction zone, withdrawing a stream of catalyst particles directly from the dense fluidized bed in said reaction zone, stripping adsorbed hydrocarbon material from the stream of catalyst, regenerating the stripped catalyst particles by burning off carbonaceous deposits in a dense fluidized bed in a regeneration zone, controlling the temperature of the catalyst undergoing regeneration to about 1200° F., withdrawing catalyst particles from the regeneration zone and recycling the same to the reaction zone, separating residual catalyst material entrained with the stream of reaction products, passing fresh naphtha feed in indirect heat exchange relation to the stream of reaction products to remove some of the heat from said reaction products, further heating the preheated naphtha feed to 800°–1000° F. preparatory to introducing the same into the reaction zone, further cooling the stream of reaction products to condense hydroformate, separating hydroformate from gaseous constituents of the reaction products stream, heating said gaseous constituents to a greater temperature than the feed material being introduced into said reaction zone and recycling the same to the reaction zone.

7. A method of converting hydrocarbon fractions boiling within the motor fuel boiling range into high anti-knock motor fuels which comprises passing vaporized hydrocarbon materials and separately introduced hydrogen containing process gas through a dense fluidized bed of finely divided hydroforming catalyst in a reaction zone at a temperature of 850°–925° F. and at a pressure of 100–500 pounds per square inch at a low catalyst to oil ratio of less than about 0.5 by weight, withdrawing a stream of reaction products containing small amounts of residual entrained catalyst overhead from the reaction zone, withdrawing a stream of catalyst particles directly from the dense fluidized bed in the reaction zone, stripping adsorbed hydrocarbon material from the stream of catalyst, regenerating the stripped catalyst particles by burning off carbonaceous deposits in a dense fluidized bed in a regeneration zone, controlling the temperature of the catalyst undergoing regeneration to below about 1200° F., withdrawing catalyst particles from the regeneration zone and recycling the same to the reaction zone, separating residual catalyst material entrained with the stream of reaction products by contacting the same with a liquid in a scrubbing zone to effect separation of catalyst particles therefrom, passing fresh hydrocarbon feed in indirect heat exchange relation to the stream of reaction products to remove some of the heat therefrom, further heating the preheated hydrocarbon feed to 800°–1000° F. preparatory to introducing the same into the reaction zone, further cooling the stream of reaction products to condense hydroformate, separating hydroformate from gaseous constituents of the reaction products stream, heating said gaseous constituents to a greater temperature than the feed being introduced into said reaction zone and recycling the same to the reaction zone.

8. A method of converting naphtha into a high anti-knock motor fuel by hydroforming which comprises passing naphtha vapors and separately introduced hot hydrogen-containing process gas through a dense fluidized bed of finely divided hydroforming catalyst in a reaction zone at a temperature of 850°–925° F. and at a pressure of 100–500 pounds per square inch at a catalyst to oil ratio by weight of about 0.5 withdrawing a stream of reaction products containing small amounts of residual entrained catalyst overhead from the reaction zone, withdrawing a stream of catalyst particles directly from the dense fluidized bed in said reaction zone, stripping adsorbed hydrocarbon material from the stream of catalyst, regenerating the stripped catalyst particles by burning off carbonaceous deposits in a dense fluidized bed in a regeneration zone, controlling the temperature of the catalyst undergoing regeneration to below about 1200° F., withdrawing catalyst particles from the regeneration zone and recycling the same to the reaction zone, separating residual catalyst material entrained with the stream of reaction products, passing fresh naphtha feed in indirect heat exchange relation to the stream of reaction products to remove some of the heat therefrom, further heating the preheated naphtha feed to 800°–1000° F. preparatory to introducing the same into the reaction zone, further cooling the stream of reaction products to condense the hydroformate, separating hydroformate from gaseous constituents of the reaction products stream, heating said gaseous constituents to a temperature of about 1100° F. and recycling the same to the reaction zone.

References Cited in the file of this patent

UNITED STATES PATENTS

| | | |
|---|---|---|
| 2,284,603 | Belchetz et al. | May 26, 1942 |
| 2,300,152 | Hemminger | Oct. 27, 1942 |
| 2,324,165 | Layng et al. | July 13, 1943 |
| 2,367,281 | Johnson | Jan. 16, 1945 |
| 2,398,489 | Arveson | Apr. 16, 1946 |
| 2,447,043 | Welty | Aug. 17, 1948 |
| 2,689,823 | Hardy et al. | Sept. 21, 1954 |
| 2,692,847 | Rex | Oct. 26, 1954 |